(12) United States Patent
Sulzer (10) Patent No.: US 7,658,005 B2
(45) Date of Patent: Feb. 9, 2010

(54) METHOD FOR PRODUCING HEAT EXCHANGER ELEMENTS, HEAT EXCHANGER ELEMENTS AND METHOD FOR ASSEMBLING SUCH ELEMENTS

(76) Inventor: Hans-Dietrich Sulzer, Sunnhaldenstrasse 53, CH-8704 Herrliberg (CH)

( * ) Notice: Subject to any disclaimer, the term of this patent is extended or adjusted under 35 U.S.C. 154(b) by 640 days.

(21) Appl. No.: 10/521,240

(22) PCT Filed: Jun. 23, 2003

(86) PCT No.: PCT/CH03/00408

§ 371 (c)(1),
(2), (4) Date: Aug. 12, 2005

(87) PCT Pub. No.: WO2004/008032

PCT Pub. Date: Jan. 22, 2004

(65) Prior Publication Data

US 2006/0027356 A1   Feb. 9, 2006

(30) Foreign Application Priority Data

Jul. 15, 2002   (EP) .................................. 02015764

(51) Int. Cl.
*B29D 53/02* (2006.01)
*F24D 5/10* (2006.01)
*F28F 3/12* (2006.01)

(52) U.S. Cl. .................. 29/890.03; 165/47; 165/53; 165/168; 165/169; 165/905; 237/69; 52/220.3

(58) Field of Classification Search ............... 165/45, 165/47, 53, 56, 163, 168, 169, 905; 62/235; 237/69; 52/220.3, 220.7; 29/890.03, 890.039, 29/890.04, 890.045
See application file for complete search history.

(56) References Cited

U.S. PATENT DOCUMENTS

| 2,955,437 | A | * | 10/1960 | Nilsson ........................ 62/235 |
| 4,285,385 | A | * | 8/1981 | Hayashi et al. .......... 29/890.03 |
| 4,294,078 | A | * | 10/1981 | MacCracken ............... 165/163 |
| 4,467,619 | A | * | 8/1984 | Kovach ........................ 165/47 |
| 4,779,673 | A | * | 10/1988 | Chiles et al. ................... 237/69 |
| 5,042,569 | A | * | 8/1991 | Siegmund .................. 52/220.3 |
| 5,069,199 | A | * | 12/1991 | Messner ....................... 165/45 |
| 5,205,091 | A | * | 4/1993 | Brown ........................ 52/220.7 |

(Continued)

FOREIGN PATENT DOCUMENTS

CA   1 150 722   7/1983

(Continued)

*Primary Examiner*—Ljiljana (Lil) V Ciric
(74) *Attorney, Agent, or Firm*—Harness, Dickey & Pierce (57) ABSTRACT

A heat exchanger panel for a surface of a room, the panel having plate-type heat exchanger elements and having a heat exchanger pipe. The heat exchanger elements include two main surfaces facing away from each other and a peripheral surface linking the main surfaces, a fiber mat and a thin plaster layer. The plaster layer adheres to the fiber mat and the heat exchanger pipe extends at least partially within the plaster layer. The pipe has at least two connections in the area of the peripheral surface.

5 Claims, 7 Drawing Sheets

U.S. PATENT DOCUMENTS

| | | | | |
|---|---|---|---|---|
| 5,327,737 A * | 7/1994 | Eggemar | | 165/56 |
| 5,579,996 A * | 12/1996 | Fiedrich | | 237/69 |
| 5,879,491 A * | 3/1999 | Kobayashi | | 165/56 |
| 5,931,381 A * | 8/1999 | Fiedrich | | 237/69 |
| 5,957,378 A * | 9/1999 | Fiedrich | | 165/45 |
| 6,021,646 A * | 2/2000 | Burley et al. | | 165/45 |
| 6,805,298 B1 * | 10/2004 | Corbett | | 165/56 |
| 6,969,832 B1 * | 11/2005 | Daughtry, Sr. | | 219/531 |

FOREIGN PATENT DOCUMENTS

| | | |
|---|---|---|
| CH | 606 937 | 11/1978 |
| DE | 26 21 938 | 11/1977 |
| DE | 37 13 203 A1 | 10/1988 |
| DE | 41 31 797 A1 | 4/1993 |
| DE | 0 997 586 A1 | 5/2000 |
| DE | 199 22 233 C1 | 7/2000 |
| DE | 200 11 751 U1 | 10/2000 |
| DE | 201 16 155 U1 | 3/2002 |
| EP | 1 004 827 A1 | 5/2000 |
| EP | 1 134 504 A2 | 9/2001 |
| EP | 1 248 047 A2 | 10/2002 |
| NL | 1 016 946 | 6/2002 |

* cited by examiner

METHOD FOR PRODUCING HEAT EXCHANGER ELEMENTS, HEAT EXCHANGER ELEMENTS AND METHOD FOR ASSEMBLING SUCH ELEMENTS

This application is the national phase under 35 USC §371 of PCT International Application No. PCT/CH2003/000408, which has an international filing date of Jun. 23, 2003, which designated the United States of America and which claims priority under 35 USC §119 to European Patent Application 02015764.0, filed on Jul. 15, 2002, the entire contents of which are hereby incorporated by reference.

BACKGROUND

Pipe systems or cooling or heating elements are mounted on walls and, particularly, on ceilings of rooms which require only a small cooling or heating capacity. When operated, a heating or cooling medium, preferably a liquid, but optionally a gas, is conveyed through the pipe system. Since the cooling or heating capacity of such elements is often relative small, the pipe systems can be arranged behind a visible surface. In the case of drooped ceilings, cooling or heating registers, including conduits which lead from an inlet connection to an outlet connection, are, for example, laid onto the ceiling elements so that they lay on that side of the ceiling elements which is turned away from the room. In order to enable direct contact of room air with the conduits, the ceiling elements comprise passage openings. Air circulation, which enhances the desired heat exchange, will develop with cooling conduits, because the cooled air will sink down. With heating conduits, however, heated air will rise in the cavity above the drooped ceiling, and a circulation will develop in this cavity so that any heating effect to the room below will act from the cavity, thus not in an efficient way.

Apart from pipe systems on drooped ceilings, plaster ceilings are also known, into which pipe systems are incorporated. To this end, sandwich type boards coated with plaster are mounted on the ceiling or a structure drooped from the ceiling. A pipe system is adhered to the plaster surface, and subsequently as much plaster is applied so as to cover the pipe system. Pipe systems can also be adhered on walls and can subsequently be covered by a cast material. In order to cover the pipe system, much plaster has to be applied, which entrains correspondingly high expenses. In addition, adhering the pipe system is already expensive.

If the heating or cooling capacity required is small, it can, in some cases, already be done with a pipe system which extends over merely a small partial surface of a wall or ceiling. For mini-energy houses of wooden construction, for example, channels are milled into massive panels, and conduits are laid into these channels. The panels with the conduits or with a single snake-shaped conduit are inserted instead of a massive wall panel so that the smooth surface is facing the living or working room. This smooth surface is painted or provided with wall paper or cast material. Such panels, having a conduit inserted in a channel, can be mounted as ready-made elements so that at least adhering the conduits and applying a cast coating, which covers the conduit, is avoided. Where such a heat exchanger element is mounted, a connection facility to a supply conduit and a discharge conduit has to be provided. The conduits of the element are coupled to the connection conduits by connection pieces, for example split ring clutches. After that, the region of the connection conduits or connections are closed by a cover. These panels comprising the conduits inserted on their back side have various disadvantages, such as that they are only able to be tied up on small wall or ceiling areas. Moreover, they constitute a special design whose dimensions have to be adapted to the prevailing conditions. The cooling or heating calorific output has to be achieved through a massive panel which involves a reduction of efficiency. This reduced efficiency results in a reduced heat flux between the inner room and the heat exchanging conduits, the flux, in addition, being competed by an undesirable high heat flux through the wall.

From DE 196 36 944, a design in form of a sandwich structure is known where cooling pipe registers are inserted between two dry structural panels. These elements are installed side by side in a raster-like manner for providing a cooling ceiling. In order to connect the cooling pipe registers to a cooling circuit, a supply pipe, a discharge pipe and connection pipes are provided above the sandwich elements. In the contact region of joining elements, gaps will form at the lower side of the cooling ceiling which have to be troweled off or pasted over, if desired. These sandwich elements involve expansive mounting work, because they are heavy and need free space above the cooling ceiling to accommodate the above-mentioned pipes. Production of the elements is very expansive, because two dry structural panels have to be mounted in the desired distance to one another, and prior to this the cooling pipes have to be inserted. The sandwich structure requires spacers between the panels which act as a sound bridge so that sound from the ceiling is transmitted and can be dissipated again. Thus, for isolating sound, further elements have to be used.

DE 42 43 426 discloses a panel having inserted small pipes of plastic material which panel is produced in a mold. The casting mass for producing the panel consists of sand mixed with a liquid bonding agent. Producing the cast panels is very expansive, particularly because the pipes have to be held in position, while filling in the casting mass. In order to give the panels sufficiently high stability for transporting and mounting them, they have to have a minimum thickness which, with panels of larger dimensions, result in an undesirably high weight. In correspondence with the high weight, mounting them to a ceiling is expansive, and connections to the ceiling have to be provided which can resist high loads. Individual panels mounted on a ceiling or a wall appear to be a foreign-object. In addition, connecting conduits have to be installed in the region of such panel.

Document NL 1 016 946 discloses heat exchange panels comprising conduits which are embedded into a layer of material, such as plaster. In order to reduce the high weight of these massive panels, an embodiment is described wherein a stable frame is arranged at the back side of the material layer and the conduits. Isolating material can be inserted into the frame. Connection conduits lead high up, i.e. away from the main surfaces of the panel, so that the panels can only be mounted in a drooped manner so as to be spaced from the ceiling. In addition, the panels, even with a frame, are heavy and expansive in producing and mounting.

EP 0 997 586 A1 discloses wall elements which comprise panels having grooves and conduits, the conduits being inserted into the grooves and being surrounded by a layer of heat conductive mortar 4. The panels 1 consist preferably of concrete bound wood wool. These solid panels are expansive in production and have a high weight.

EP 1 004 827 discloses plaster panels comprising conduits and an isolating material attached thereon, for example glass wool. The conduits are either inserted into milled grooves of the plaster panels or directly during production of the plaster panels into liquid plaster. In order to ensure sufficient treating stability, the plaster panels have to be sufficiently thick in correspondence with their dimensions. The plaster panel together with the conduits are connected to a fibrous mat. Document DE 200 11 751 U1 discloses plaster panels comprising grooves and conduits situated therein. Mineral fiber boards are attached to the stable plaster panels. These plaster panel elements are heavy due to the relative thick plaster panels. In addition, production is difficult.

DE 41 31 797 describes elements comprising two plaster panels and an intermediate layer of heat conductive material and conduits. Towards the ceiling, an isolating layer is provided. Connection conduits lead high up from the element. The structure of this solution is very expansive and results in drooped ceilings of too much weight.

SUMMARY

Due to the deficiencies of the solutions according to the prior art, it is an object of the invention to find a simpler design as to production and mounting which, in addition, ensures a desired heat flux, is optically attractive and sound isolating. Preferably, areas of different dimensions should be able to be provided with heat exchanging surfaces.

An inventive and, as to production and mounting, simple design is achieved, if at least one heat exchanging conduit is laid onto a fibrous mat, and at least one coating of a cast coating is applied to the fibrous mat so that the at least one conduit extends at least partially within the cast coating, and the cast coating together with the at least one heat exchanging conduit adheres to the fibrous mat.

When solving the problem, it has been recognized that a fibrous mat comprising a cast coating on a main surface is sufficiently stable to stand transporting and mounting without being damaged. The term "fibrous mat" should mean an air permeable layer shaped product wherein the fibers are interconnected in regions of contact by a bonding agent. Such fibrous mats comprise a voidage and are at least slightly elastically deformable. Within the mat, there are interconnected air channel systems. A suitable fibrous mat has, for example, a thickness of at least 25, optionally in a range of 30, but particularly in a range of 60 mm, and comprises, for example, glass fibers, rock wool, silicate fibers or fibers of plastic material. When at least one heat exchanging conduit is laid onto the fibrous mat, and subsequently a cast coating is applied, the at least one heat exchanging conduit will extend at least partially within the cast coating. The cast coating adheres to the fibrous mat and holds the at least one conduit of the heat exchanger element. The free surface of the cast coating is to level out any unevenness of the fibrous mat so that the mounted elements form a substantially flat surface. If a flat surface cannot be achieved, when applying the cast coating which encloses the conduits, a level out layer is optionally applied either between the conduits and the fibrous mat or above the cast coating together with the conduits.

For curing the cast coating, organic and inorganic bonding agents are used. For example, self-crosslinking bonding agents, addition polymers, plastic bonding agents, for example dispersions which are cured by dehydration, UV-curing bonding agents or bonding agents comprising silicates or water glass or, optionally, cement may be used. In order to enable production of the heat exchanger elements with less time requirements, optionally quickly curing bonding agents are preferred.

The fibrous mat, due to its air channel system, acts as an insulation. In this way, it is ensured that the largest proportion of heat flux from and to the at least one heat exchanging conduit goes through the cast coating, thus directly towards the inner room. This ensures an efficient heat exchange between the heat exchanger element and the inner room. Heat exchange between the heat exchanging fluid and the inner room can be enhanced, if conduits of a high caloric conductivity are used, for example of metal. With metal pipes, in addition, a smaller wall thickness may be provided. Moreover a cast of high caloric conductivity may be used. Caloric conductivity of the cast is increased, if the voidage in the cast is reduced, and/or a cast mass, or an additive to the cast mass, is used which has a high caloric conductivity. A cast having a grain proportion may comprise, for example, an aluminum hydroxide, particularly aluminum orthohydroxide. Optionally, two layers of cast material having different grain proportions are applied, particularly a first layer adjacent to the fibrous mat, which has a coarse grain, if appropriate of a smaller density, and a second layer applied to the first layer comprising a finer grain, particularly of higher density. The grain proportion comprises, for example, an average particle size in the range of 0.1 to 0.5 mm, but preferably of 0.25 to 0.3 mm, the particle sizes varying, in particular, in the range of 0.1 to 0.5 mm, but preferably from 0.2 up to 0.4 mm.

The cast coating has a thickness which is in the range of the outer diameter of the heat exchanging conduit. With an outer diameter of, for example, 3 to 4 mm, a cast coating of a thickness of 2 to 8 mm, preferably 3 to 6 mm, can be applied onto the fibrous mat. It would be possible that partial areas of the conduit's surface remain visible so that caloric exchange of these partial areas are not affected by the cast coating. If a cover coating is applied after having mounted the elements, this cover coating will cover the conduits, thus ensuring a uniform appearance of the whole ceiling. The cover coating may optionally have a thickness in the range of only 0.3 to 2 mm, preferably 0.5 to 1.5 mm. If the heat exchange conduit is covered by an extremely thin layer, which just prevents visibility of the conduits, caloric transfer between the conduit and the inner room is merely insubstantially affected by the cast coating. Since the fibrous mat has a small density and the cast coating has a small thickness, the weight of an element is small, wherein the main surface of a, preferably rectangular, element has a length in the range of 60 to 120 cm, preferably substantially 80 cm, and a width in the range of 40 to 80 cm, preferably substantially 60 cm, which facilitates mounting. The adhesive forces necessary between the elements and the ceiling are small, due to the small total weight of an element, and may be ensured by gluing.

Fibrous mats having a cast coating may be mounted side by side to walls or ceilings so as to cover the whole surface. In doing this, the uncoated main surface of the fibrous mat is connected, preferably glued, to the ceiling, the wall or to engaging surfaces connected to them. When the gaps between the coated fibrous mats are filled, and the continuous cast surface is covered by a cover coating, a continuous inner surface will be obtained. According to the present invention, at least one element comprising at least one heat exchange conduit is used. The number of heat exchanger elements depends on the desired heating or cooling capacity. That surface where no heat exchanger elements are required, may be covered by coated fibrous mats without any conduit so that the whole ceiling or wall has a uniform appearance. By applying a cover coating that extends over all elements, recognizing the heat exchanger elements may be prevented.

The elasticity of the fibrous mat is sound insulating. Transfer of sound to the ceiling or the holding structure for holding the elements is very small, because there are no sound bridges in a fibrous mat. The cast coating forms a membrane whose oscillations are strongly attenuated by the fibrous mat. If the cast coating is air permeable, the air channels in the fibrous mat may also contribute to sound insulation. If a very elastic fibrous mat is used, it is convenient if also the conduits and the cast coating are somewhat deformable. To this end, conduits of plastic material are used for example.

A deformable cast coating may be achieved using artificial resin bonding agents or dispersion bonding agents. Particularly if the grains of the cast coating are interconnected merely by thin, elastic bridges, for example if the bonding agent proportion is low, one can prevent that the cast coating may be damaged due to deformation of the fibrous mat. Optionally, deformability of the elements may be reduced by profiles, such as longitudinal or transversal profiles. These parts serve preferably for holding the conduit in a desired arrangement, while coating the elements. By the fact that the cast coating adheres directly to the fibrous mat and is thin, a strongly different mechanical behavior of the two layers is prevented. Without a continuous intermediate layer or carrier layer, the cast coating will be directly on the fibrous mat, and the development of a sound reflective surface can be avoided.

In order to be able to fasten the heat exchanger elements directly onto a ceiling or a wall, the two required connections of each element do not project from a main surface, but are situated in the region of the peripheral surface. If a free space is provided at the branch necks between two adjacent elements, connections between the branch necks may be made after mounting the heat exchanger elements. In addition at least one branch neck for all elements is connected to a supply conduit, and at least one other branch neck is connected to a discharge conduit. The connections are formed in such a way, that a thinner fibrous mat having a cast coating can be inserted into a free space between the heat exchanger elements in a manner that the surface of the cast coating is substantially free of shoulders and is smooth. This means that the covering elements have a thickness which is below the thickness of the heat exchanger elements by the connection depth required. The free spaces may extend in a channel-like manner in at least one direction over the whole ceiling and may also receive, apart from the connections, the supply and discharge conduits.

When forming a ceiling using heat exchanger elements according to the invention, in a first step the uncoated main surfaces of a first row of heat exchanger elements, whose first, and optionally whose second, side surfaces are situated side by side, are fastened to the ceiling (or wall). In the case of providing branch necks in the form of plug-in connections, the conduits of adjacent elements may be interconnected by plugging in the plug-in connections. If the plug-in connections are inserted into the fibrous mats, the elements, having them plugged in, may join together without any free space. In a design without plug-in connections, free spaces are provided which enable connecting the branch necks subsequently. In order to facilitate formation of free spaces of a defined width, the heat exchanger elements comprise, for example, spacers, particularly in the form of branch necks, but optionally holding elements are mounted in a second step to the free sides of the heat exchanger elements. The holding elements may be formed in such a way that supply and discharge conduits may be fixed to them. In a third step a second row of heat exchanger elements are fastened, the first side surfaces of which engaging each other. The second row may directly join the first row or, alternatively, may be separated from it by a predetermined free space. In a fourth step, at least two branch necks of each row, but optionally two branch necks of each heat exchanger element, are connected to a heat exchanger circuit. In a fifth step, covering elements are arranged in the region of the open lying branch necks. In the case of using holding elements or spacers, the covering elements are preferably fastened to the holding elements or spacers. In a sixth step, a cast mixture is optionally applied at least in the region of the gaps. In order to obtain a flat surface, preferably a seventh step comprising grinding is carried out. Onto the flat surface of the cast coating, optionally a cover coating, a so-called decor layer, is applied in an eighth step. For obtaining extremely flat surfaces, several layers of the cover coating are optionally applied. It will be understood that the heat exchanger elements and the holding elements may also be fastened to a supporting structure.

Apart from the use of plaster, it is preferred to use cast mixtures comprising a grain proportion. In order to obtain surfaces as smooth and/or as uniform as possible, a main grain proportion having a uniform particle size or a narrow grain size distribution is used for example. In order that the grain proportion adheres on the surface where it is applied and cures to a solid cast coating, the cast mixture comprises a bonding agent. As a bonding agent, organic or inorganic bonding agents are used. For example, self-crosslinking bonding agents, addition polymers, plastic bonding agents, for example dispersions which are cured by dehydration, UV-curing bonding agents, two package bonding agents, or bonding agents comprising silicates or water glass or, optionally, cement may be used.

The at least one heat exchanging conduit of each element has, for example, an inner diameter of 0.8 to 5 mm, preferably substantially 1 to 3 mm, and is, for example, formed of plastic material at least in part, but optionally at least partially of metal or even of a non-metal inorganic material, such as porcelain or glass. Non-combustible or non-inflammable conduits are advantageous for high requirements as to fireproofing. With a plastic conduit having an inner diameter of 1 mm, the outer diameter is in the range of 3 mm. In the case of metal conduits, possibly a larger pipe diameter is preferred, for example an outer diameter of 5 mm.

BRIEF DESCRIPTION OF THE DRAWINGS

An embodiment of the invention will be described with reference to the drawings in which.

DETAILED DESCRIPTION OF EXAMPLE EMBODIMENTS

Figure 1:
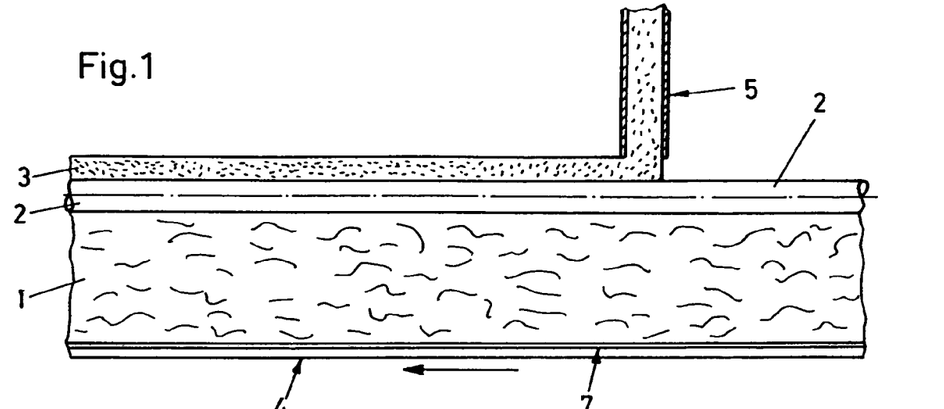
FIG. 1 is a schematic illustration of the production method for providing a heat exchanger element.

FIG. 1 shows schematically the production method wherein the main surface 7 of a fibrous mat 1 is laid onto a conveyor surface 4, preferably a belt, and is passed through a coating station 5. Before the fibrous mat 1 reaches the region of the coating station 5, at least one heat exchanging conduit 2 is laid onto the fibrous mat 51. At the coating station 5, a cast mass is applied as a layer, having a substantially smooth free surface, onto the fibrous mat 1 and, thus, also at least partially onto the at least one heat exchanging conduit 2. By the subsequent curing procedure, adherence of the cast layer 3 on the fibrous mat 1 and fixing of the conduit 2 in the cast mass is obtained. Optionally, a further layer of the cast coating 3 is applied in a further coating installation.

Figure 2A:
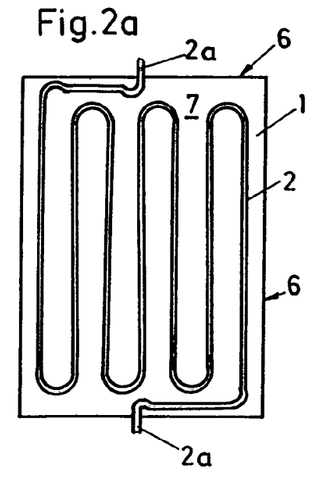
FIGS. 2a and 2b are schematic plan views of a heat exchanger element comprising a snake-like conduit arrangement.
Figure 2B:
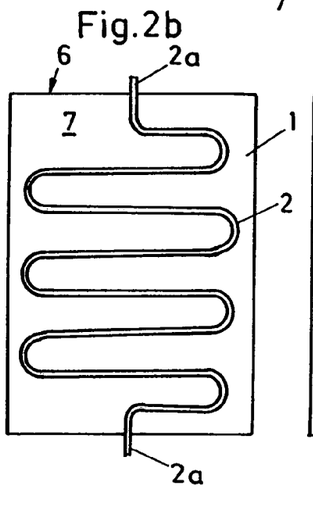
Figure 3:
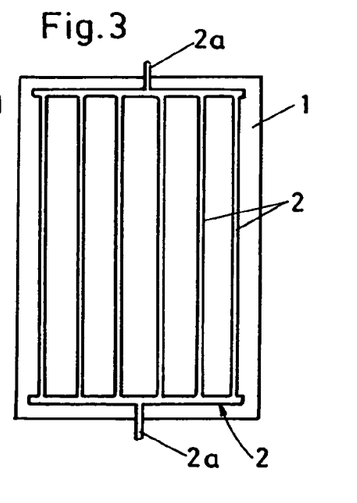
FIG. 3 is a schematic illustration of a heat exchanger element comprising an arrangement of parallel conduits.

FIGS. 2a, 2b and 3 show two typical arrangements of the conduit 2 on the fibrous mat 1. The conduit 2 is, for example, laid in snake-shape, the bendings being either in the region of the short lateral line or the long lateral line wherein, with the same length of conduit, more bendings are necessary according to FIG. 2b than according to FIG. 2a. In accordance with FIG. 3 a plurality of conduits are arranged in parallel between two manifold sections. The manifold 2 comprises two branch necks 2a in the region of the peripheral surface 6.

Figure 4:
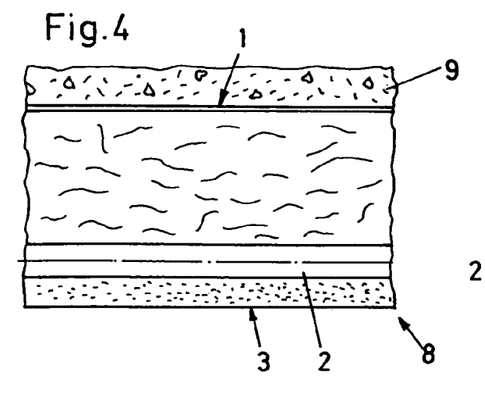
FIG. 4 shows a cross-section of a ceiling arrangement including a heat exchanger element according to the invention.

FIG. 4 illustrates a heat exchanger element 8 adhered to a ceiling 9 and comprising a fibrous mat 1, a conduit 2 and a cured cast coating 3. Since the fibrous mat has a small density and the cast coating has a small thickness, the weight of an element 8 is small which facilitates mounting.

Figure 5:
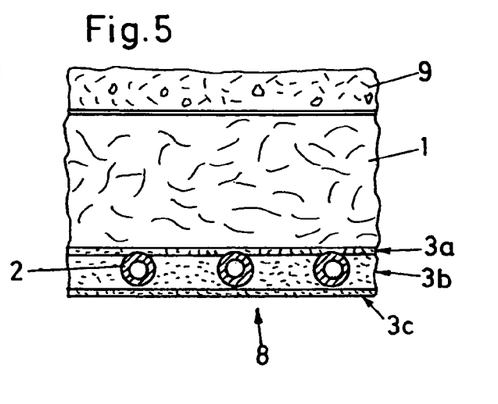
FIG. 5 shows a cross-section of a heat exchanger element comprising two different cast layers.

FIG. 5 illustrates a heat exchanger element 8 fastened to the ceiling 9 and comprising two cast layers 3a and 3b which have already been applied during production of the element 8. A thin cover coating 3c has been applied onto the free surface of the cast layers only after fastening the elements 8 to the ceiling.

Figure 6:
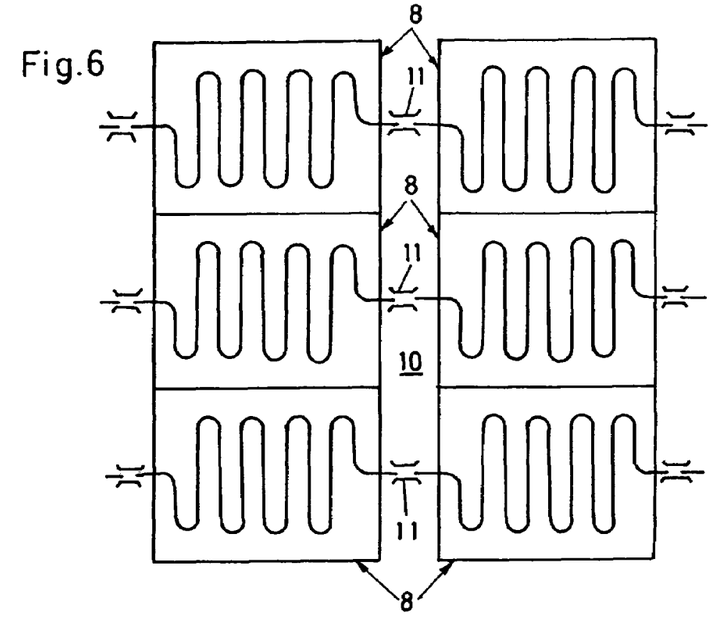
FIG. 6 is a schematic plan view of an arrangement comprising heat exchanger elements connected in series.

FIG. 6 shows two rows of heat exchanger elements 8 between which a free space 10 for connections to be made after mounting is left open. In the embodiment illustrated, adjacent elements 8 of the two rows are connected in series. To this end, the branch necks 2a of the conduits 2, which face each other, are interconnected by sleeves 11.

Figure 7:
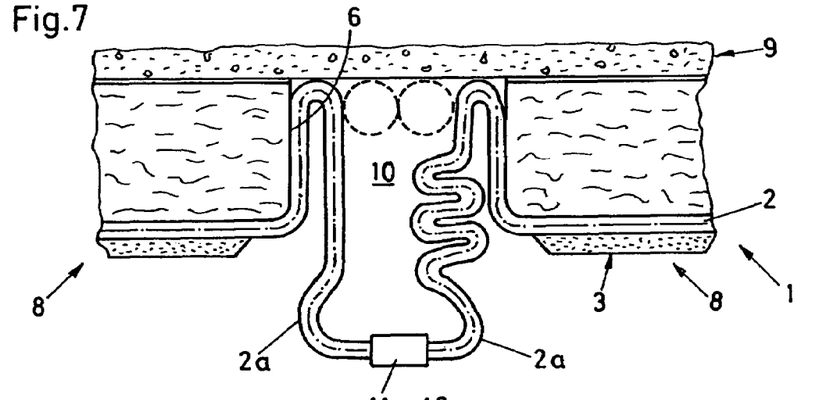
FIG. 7 shows a cross-section of a connection region of heat exchanger elements connected in series before the connection region has been closed.

In FIG. 7 it may be seen that the branch necks 2a emerge from the heat exchanger element 8 as flexible conduits in the region of the peripheral surface 6, and for interconnecting may be led a bit downwards out of the free space 10. In order to prevent tearing of the conduits 2 from the cast layer 3, they may optionally be fixed in the emerging region on the fibrous mat 1.

Figure 8:
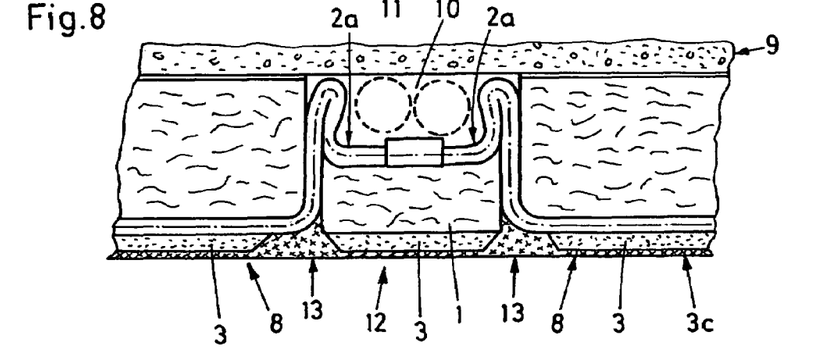
FIG. 8 shows a cross-section of a closed connection region of heat exchanger elements connected in series.

After interconnecting, plugging in and pressing the sleeve 11, the branch necks 2a are pressed into the free space 10 towards the ceiling 9, as is represented in FIG. 8. The free space 10 is closed by a covering element 12 that is pressed in, but is preferably glued in place, such that after filling the gaps 13 between the cast coatings 3 of all elements 8 and 12 of a ceiling region, and optionally after a grinding procedure, a flat cast coating surface is obtained. The cast mass used for filling the gaps corresponds, for example, to the cast mass used for coating the elements 8, 12. Optionally the bonding agent is chosen in such a way that it cures quickly. In order to prevent that transitions between the elements 8, 12 can be seen, optionally a cover coating 3c is applied to the whole ceiling.

Figure 9:
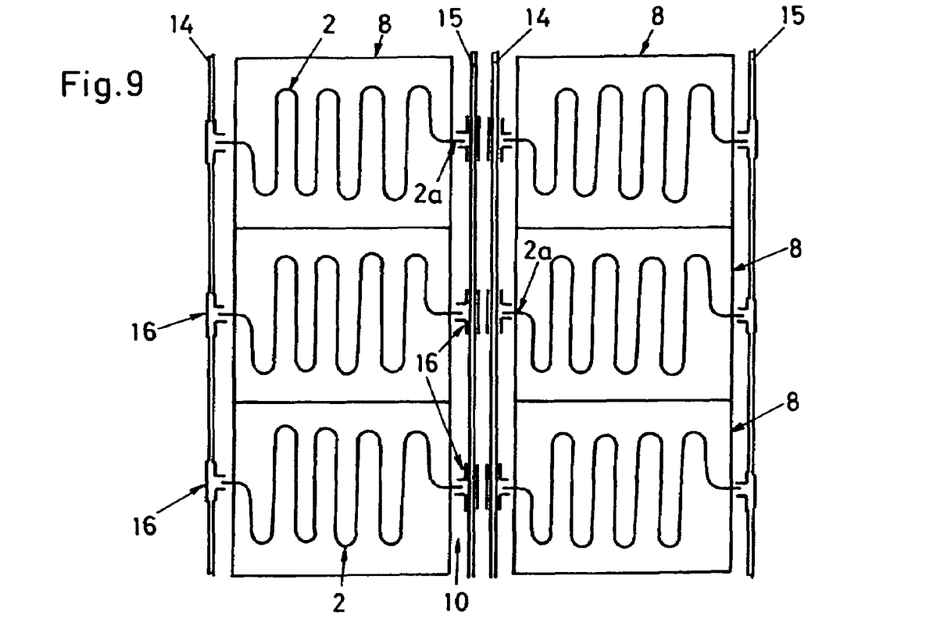
FIG. 9 is a schematic plan view of an arrangement comprising heat exchanger elements connected in parallel.

FIG. 9 shows two rows of heat exchanger elements 8 between which a free space 10 is left open for connections to be made after mounting. In the embodiment illustrated, the elements 8 of each row are connected in parallel to a supply conduit and a discharge conduit 14 and 15. To this end, the branch necks 2a of the heat exchanging conduits 2 are connected to the supply and discharge conduits 14 and 15, and thus to a heat exchanger circuit, by means of T-shaped joint pieces 16. It will be understood that the branch necks 2a of a heat exchanger element 8 may both be arranged on the same side so that two rows of elements 8 can be connected via only one free space 10.

Figure 10:
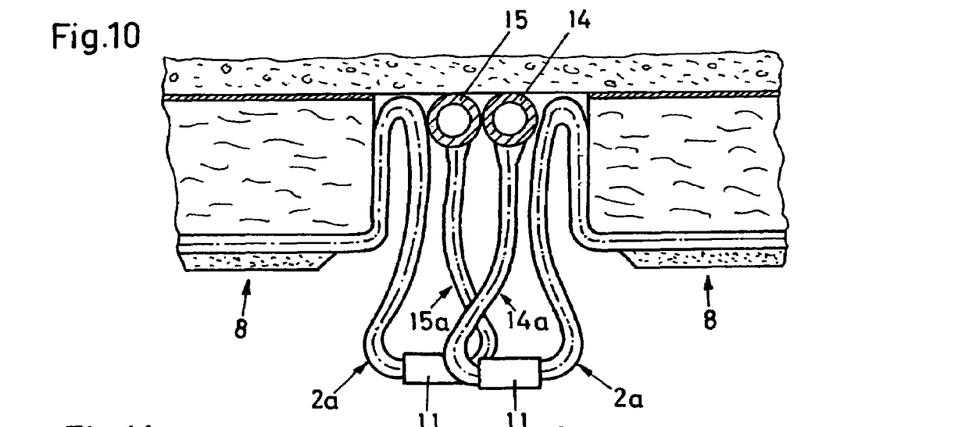
FIG. 10 shows a cross-section of a connection region of heat exchanger elements connected in parallel before the connection region has been closed.

FIG. 10 shows supply and discharge conduits 14, 15 comprising branch necks 14a, 15a which hang down from the free space 10 and may be connected to the branch necks 2a by sleeves 11. Simple connecting is possible, if each branch neck 2a comprises a flexible plastic pipe or is connectable to a flexible plastic pipe so that each branch neck 2a may be connected to a branch neck 2a of an adjacent heat exchanger element 8 or to a connection conduit 14, 15.

Figure 11:
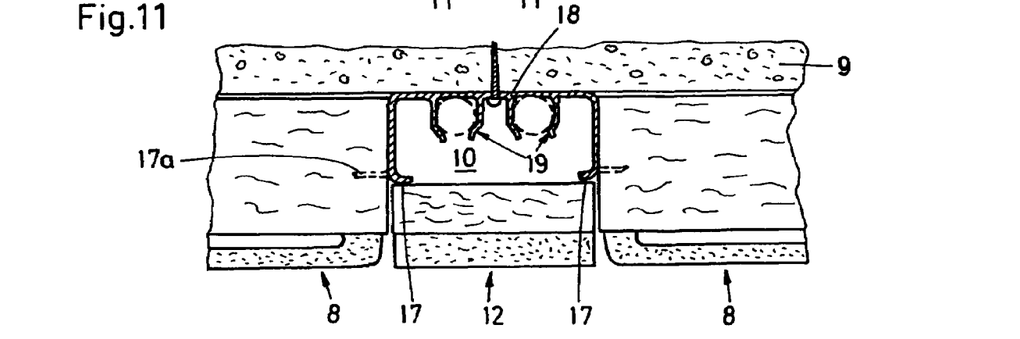
FIG. 11 is a cross-sectional view through the covered connection region comprising holding elements.

According to FIG. 11, holding elements 18 are mounted to the ceiling 9 either for defining the width of the free space 10, optionally for holding supply and discharge conduits 14 or 15, and particularly for providing nailing and fastening surfaces 17. Optionally, the holding elements engage the heat exchanger elements 8 by claws 17a. The distance of the nailing and fastening surfaces 17 from the ceiling 9 and the thickness of the covering elements 12 to be inserted into the free space 10 corresponds to the thickness of the heat exchanger elements 8. The covering elements 12 are preferably glued to the nailing and fastening surfaces 17. For holding the supply and discharge conduits 14 and 15, the holding elements 18 comprise suitably cramps 19 so that the conduits 14 and 15 can be held already prior to inserting the covering elements 12 in the free space 10.

Figure 12:
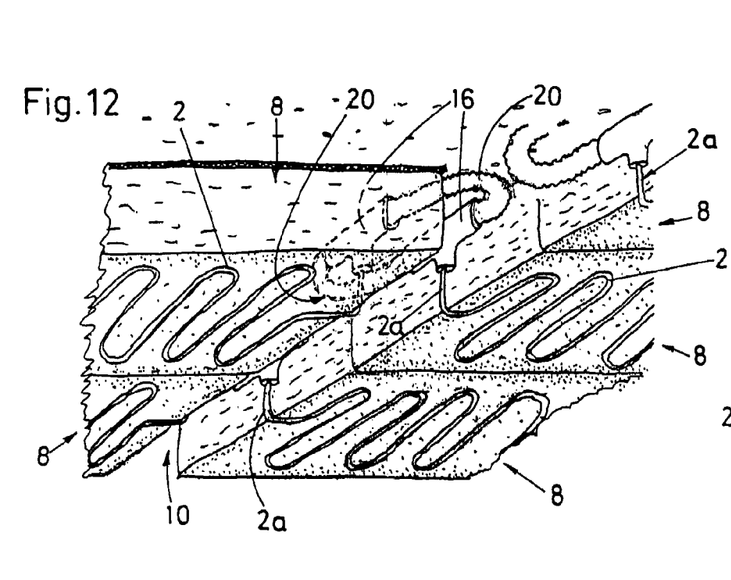
FIG. 12 is a perspective view of a ceiling area comprising heat exchanger elements connected in series and being schematically illustrated.
Figure 13:
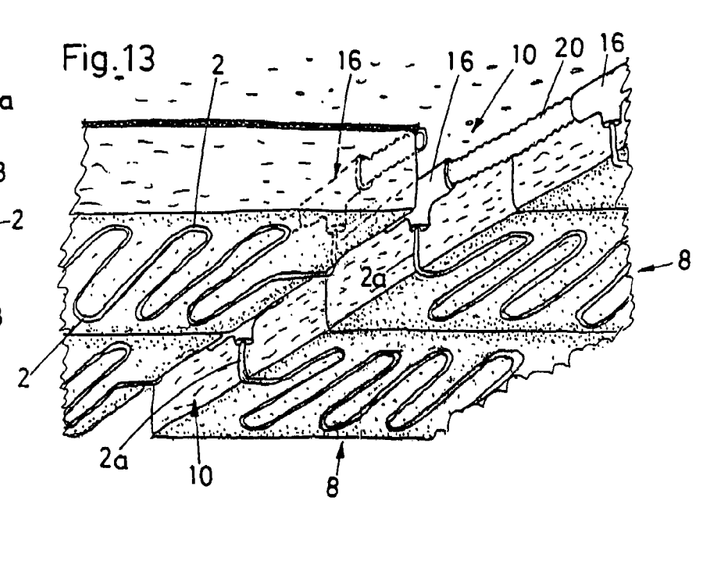
FIG. 13 is a perspective view of a ceiling area comprising heat exchanger elements connected in parallel and being schematically illustrated.

FIGS. 12 and 13 show a ceiling area and schematically illustrated heat exchanger elements 8 arranged at both sides of a free space 10, the cast coating being not illustrated so that the conduits 2 may be visible. Each branch neck 2a is connected to a T-shaped connection piece 16. According to FIG. 12, the connection pieces 16, which face each other, are interconnected each to two connection conduits 20 so that the heat exchanger elements 8 at both sides of the free space 10 are connected in series. According to FIG. 13 the connections conduits 20 extend in longitudinal direction of the free space 10 from one connection piece 16 to the next one so that the heat exchanger elements 8 are connected in parallel at one side of the free space 10. The T-shaped connection pieces 16 may be separated from the heat exchanger elements 8 or are connected with them.

Figure 14A:
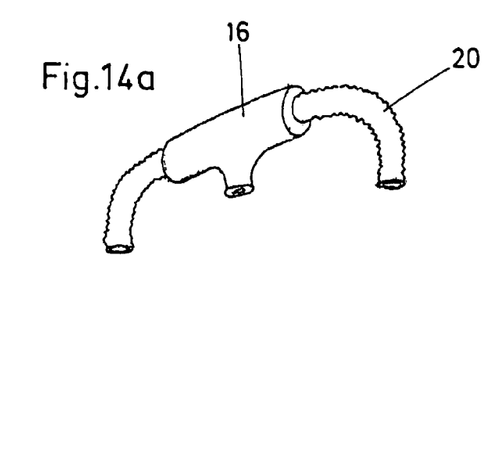
FIGS. 14a, 14b, 14c are perspective views of branch neck pieces.
Figure 14B:
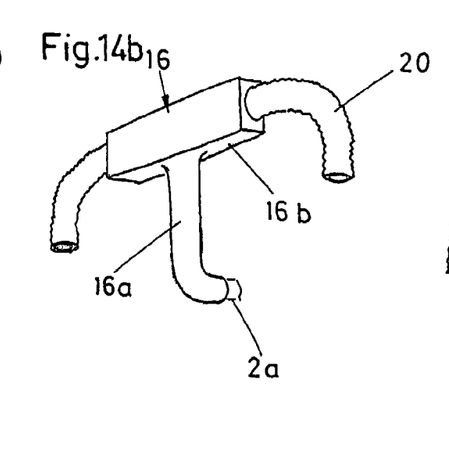
Figure 14C:
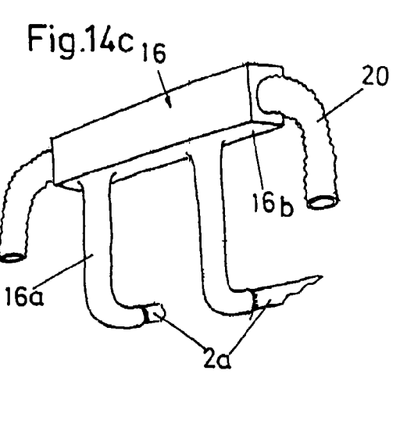
Figure 15:
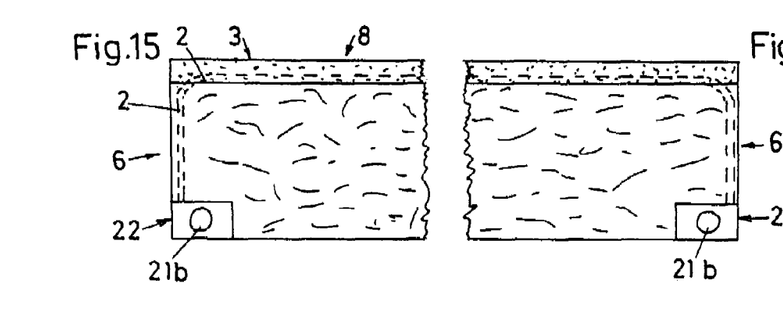
FIG. 15 is affront elevation of a heat exchanger element having connections in the form of plug-in connections.
Figure 16:
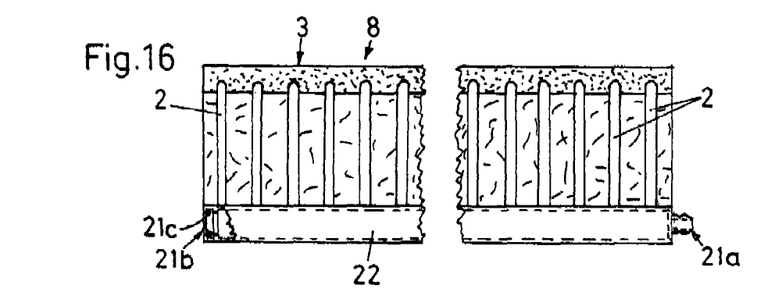
FIG. 16 is a lateral view of a heat exchanger element having connections in the form of plug-in connections.
Figure 17:
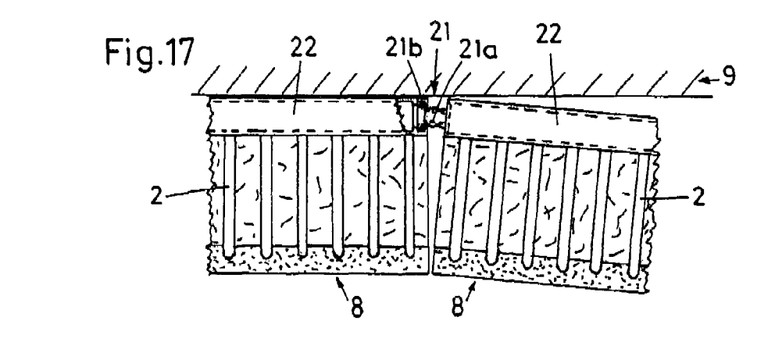
FIG. 17 is a lateral view of two heat exchanger elements having connections in the form of plug-in connections during assembling.

FIG. 14a shows a connection piece 16 which is connected to a branch neck 2a, after having mounted the heat exchanger element 8, and is held in the free space 10 by a holding device. FIGS. 14b and c show connection pieces 16 which have already been fixed to the heat exchanger element 8 prior to mounting the heat exchanger elements, and are connected to the branch neck 2a by at least one solid piece of pipe 16a. The connection piece 16 according to FIG. 14c pertains to a heat exchanger element 8 which has two conduits 2 and, thus, four branch necks 2a. Instead of holders 18 to be mounted separately, the connection pieces 16 fastened to the heat exchanger elements 8 are able to ensure both holding the connection conduits 20 as well spacing. It will be understood that spacers may be arranged independently from a connection to the heat exchanger elements 8 so that they may directly cemented with the elements 8 to the ceiling. When the connection pieces 16, which engage each other at the front side, are in mutual contact, a free space 10 will be provided of predetermined width. The covering elements 12 may be laid to engage the downwards directed, horizontally extending surfaces 16b.

FIGS. 15 to 18 illustrate an embodiment which comprises heat exchanger elements 8 including branch necks in the form of plug-in connections 21, where a male part 21a can be plugged into a female part 21b. Each heat exchanger element 8 comprises two parallel extending longitudinal channels 22 and at least one conduit 2 that extends from one longitudinal channel 22 to the other. Optionally, this conduit 2 is arranged in snake shape. In the embodiment illustrated, a plurality of parallel extending conduits 2 extend from one longitudinal channel 22 to the other. The longitudinal channels 22 are preferably arranged in the region of the peripheral surface 6 and, particularly, in the region of that main surface of the heat exchanger element 8 which is averted from the cast coating 3. When mounting, an element 8 to be mounted comprises an upwards directed layer of glue and is placed towards another element 8, which has already been mounted, under a small angle to the ceiling 9 so that the two male parts 21a can be plugged into the corresponding female parts 21b. It will be understood that by arranging a respective male and female part on the same front surface, similar as with the rails of model railways, one can prevent that two identical part meet each other. After that, the element to be mounted is pressed against the ceiling up to the moment when the glued joint holds on. A sealing ring 21c is inserted in an annular groove, for example, of the female part 21b so that the plugin connection 21 is sealed, the sealing ring 21c being sealingly pressed by the male part 21a after they have been plugged together. In the embodiment illustrated, the conduits 2 and the longitudinal channels 22 are located in recesses of the fibrous mat 1 so that the heat exchanger elements 8 may be mounted joining closely each other along the whole peripheral surface 6. In this way, no free spaces 10 are required between the elements.

Figure 18:
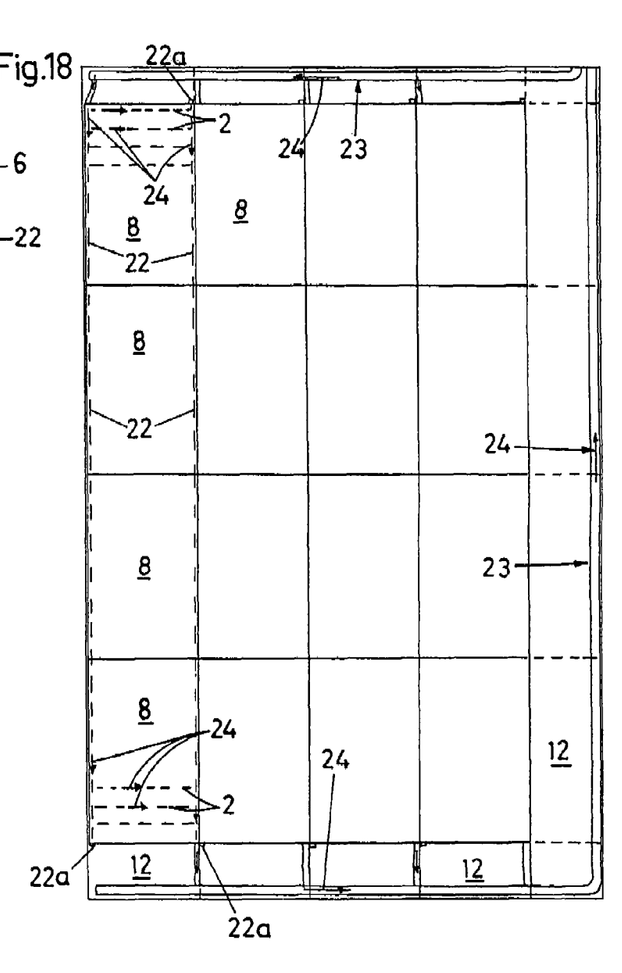
FIG. 18 is a view of a ceiling from below comprising heat exchanger elements which are interconnected by plug-in connections.

According to FIG. 18, all elements 8, plugged together in rows, are connected to supply and discharge conduits 23. In order to achieve the flow of a heat exchanging medium through the conduits 2 of the elements 8, as is represented by arrows 24, the supply conduit 23 is connected at one end of the room to a respective longitudinal channel 22, and the supply conduit 23 at the other end of the room is connected to another longitudinal channel 22. Since the longitudinal channels 22 are only connected at one room end, they have to be closed at the other room end by counter-covers 22a. Having made the connections and attached the counter-covers 22a, the marginal region together with the supply conduit 23 is covered by covering elements 12.

Figure 19:
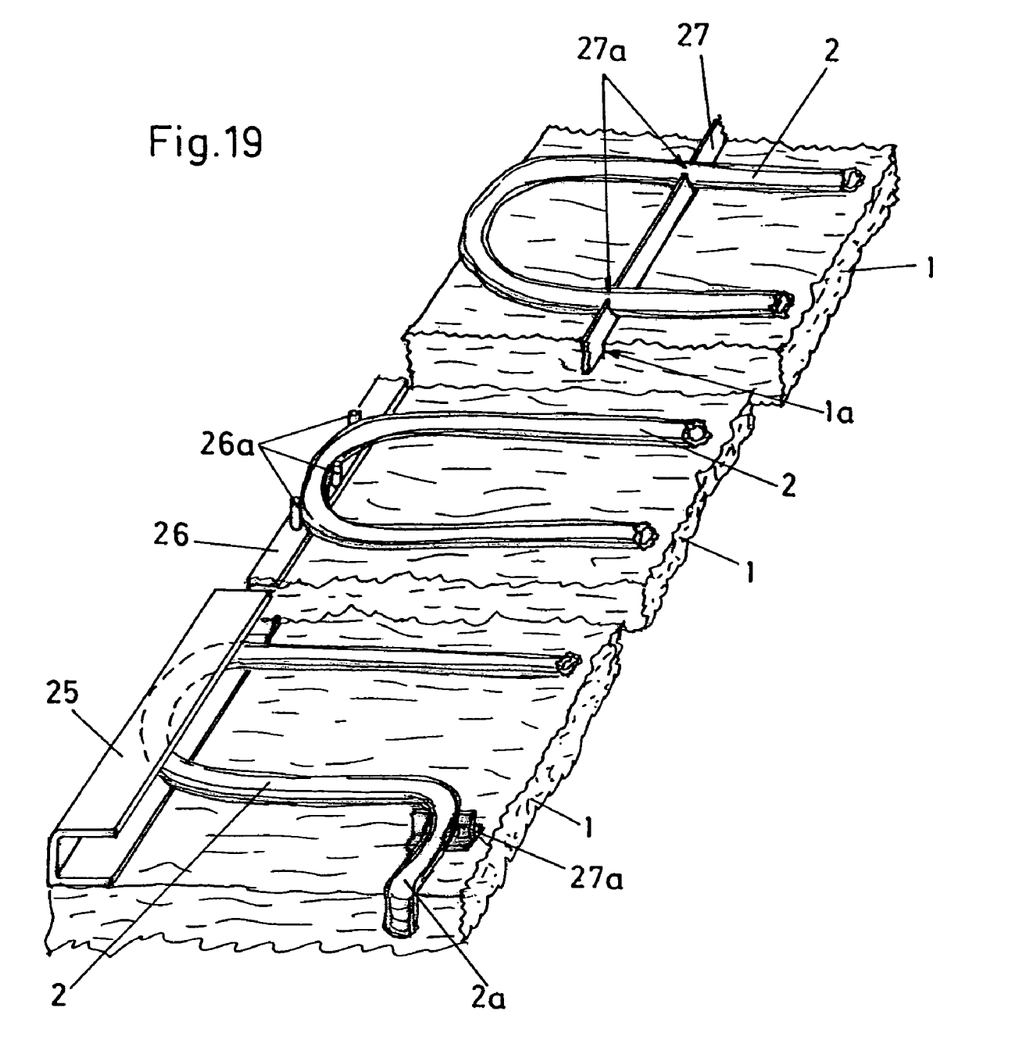
FIG. 19 is a perspective view of fibrous mats comprising conduit holders and conduits.

FIG. 19 shows auxiliary elements which facilitate laying the conduit 2 onto the fibrous mat 1 in a desired shape and which increase stability of an element 8 provided with them. A clamping element 25 is formed as a U-profile and clamps securely the roundings of the conduit 2. A laying flat element 26 having projecting knobs 26a guides the conduit 2 in the region of the rounding by means of the knobs 26a. An upright flat element 27 holds the conduit 2 on each side of the rounding, the upright flat element 27 comprising recesses 27a for allowing passage of the conduit 2 and being preferably inserted into a groove la of the fibrous mat 1. In order to orient the branch necks 2a in a desired direction away from the element 8, optionally a short flat element 27a is provided.

Figure 20:
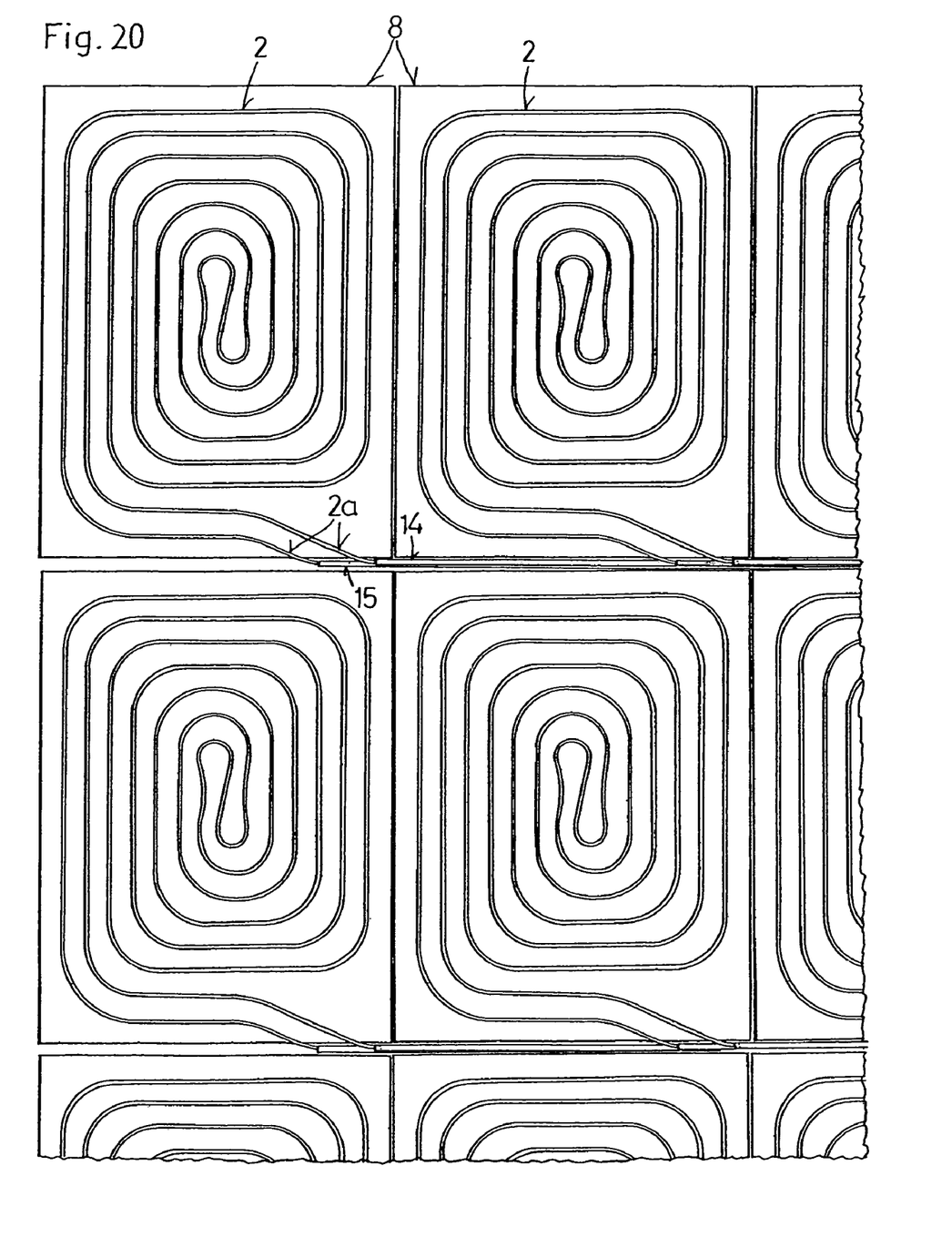
FIG. 20 is a schematic plan view of an arrangement comprising heat exchanger elements connected in parallel, where the heat exchanging conduit is substantially tangential to the peripheral surface.

FIG. 20 illustrates an embodiment comprising heat exchanger elements 8 connected in parallel, wherein the heat exchanging conduit 2 extends substantially in tangential direction with respect to the peripheral surfaces 6 in the region of the branch necks 2a and of the peripheral surfaces 6. By extending in tangential direction in the marginal region of the main surface 7, lateral emergence of the conduit 2 at the peripheral surface 6 can be made with minimum bending or with large radii of curvature. The branch necks 2a are connected to connection conduits 14, 15 which preferably have a larger cross-sectional area so that the flow resistance is not unnecessarily increased. In the embodiment illustrated, all heat exchanger elements 8 are connected in parallel. Since the branch necks 2a are arranged side-by side, it is advantageous if a joining conduit 2 is folded substantially in the middle, and is laid as a double conduit in spiral shape.

The choice of the diameter of the conduits 2 is influenced by the following features: weight, pressure drop and flow configuration.

To obtain a weight as low as possible, the outer pipe diameter should be as small as possible. In this case, the inner diameter will also be small. A possible choice is an outer pipe diameter of 5 mm and a wall thickness of 1 mm.

In the case of cooled ceilings, temperature of the heat absorbent medium should not be much deeper than that of the room to be cooled in order to avoid an undesirable condensation of air moisture on the ceiling or on the heat exchanger element. The temperature of the heat absorbent medium is, in general, between 15 and 5° C., preferably 10° C. lower than the desired room temperature. At the exit from the heat exchanger 8, there will still exist a temperature difference.

In order to ensure efficient heat transition, a turbulent flow of the heat absorbing medium is desirable. Therefore, the Reynolds' number should be larger than 2300. This is obtained, if the total length of the conduits 2 between the connection conduits 23 is in the order of $10^4$ times the inner pipe diameter. In case, this conduit length is not attained with heat exchanger elements 8 connected in parallel, a connection in series will be preferred. In addition, one can avoid parallel extending conduits (2) in each element 8 by laying the conduit 2 in snake-shape.

The pipe diameter cannot be chosen too small, because the pressure drop is approximately inversely proportional to the fifth power of the inner pipe diameter.

The invention claimed is:

1. A method for assembling heat exchanger elements including a fibrous mat, wherein the fibrous mat has a thickness of at least 25 mm and includes fibers which are interconnected by a bonding agent, and at least one heat exchanging conduit for a heat exchanging medium, the heat exchanger elements being panel shaped and including at least two main surfaces averted from each other and a peripheral surface connecting the main surfaces, the method comprising:

attaching at least two heat exchanger elements adjacent to each other, to a room delimiting surface, wherein uncoated main surfaces of the fibrous mats are glued to said room delimiting surface, and in a first step, a first row of heat exchanger elements are fastened with their first lateral surfaces situated side by side, in a second step, holding elements are mounted to join the second side surfaces, in a third step, a second row of heat exchanger elements are fastened so as to join said holding elements and their first side surfaces engaging each other, in a fourth step, the two branch necks of each heat exchanger element are connected to a heat exchanger circuit, in a fifth step, a cast mixture is applied over the heat exchanger elements and the at least two branch necks so that a substantially flat cast surface is obtained, wherein a thickness of the cast mixture is in a range of 2 to 8 mm and the at least one heat exchanging conduit is contained in the cast mixture, and wherein the cast mixture together with the at least one heat exchanging conduit, adheres to the fibrous mat.

2. The method as claimed in claim 1, wherein in a sixth step, a flat surface is obtained by grinding, and in a seventh step, a cover coating is applied.

3. A method for assembling heat exchanger elements including a fibrous mat, wherein the fibrous mat has a thickness of at least 25 mm and includes fibers which are interconnected by a bonding agent, and at least one heat exchanging conduit for a heat exchanging medium, the heat exchanger elements being panel shaped and including at least two main surfaces averted from each other and a peripheral surface connecting the main surfaces, the method comprising:

attaching at least two heat exchanger elements adjacent to each other, to a room delimiting surface, wherein uncoated main surfaces of the fibrous mats, for fastening the heat exchanger elements, are glued to said room delimiting surface, wherein in a first step, a first row of heat exchanger elements are fastened with their first lateral surfaces situated side by side, while spacer elements project from their second lateral surfaces, in a second step, a second row of heat exchanger elements, their first lateral surfaces engaging each other, are fastened so that they join said second lateral surfaces and are spaced by spacer elements, in a third step, the two branch necks of each heat exchanger element are connected to a heat exchanger circuit, in a fourth step, covering elements are arranged at the spacer elements, in a fifth step, a cast mixture is applied at least in regions with gaps over the heat exchanger elements and the at least two branch necks so that a substantially flat cast surface is obtained, wherein a thickness of the cast mixture is in a range of 2 to 8 mm and the at least one heat exchanging conduit is contained in the cast mixture, and wherein the cast mixture together with the at least one heat exchanging conduit, adheres to the fibrous mat.

4. The method as claimed in claim 3, wherein in a sixth step, a flat surface is obtained by grinding, and in a seventh step, a cover coating is applied.

5. A method for assembling heat exchanger elements including a fibrous mat with a thickness of at least 25 mm and including fibers which are interconnected by a bonding agent, the heat exchanger elements being panel shaped and including at least two main surfaces averted from each other and a peripheral surface connecting the main surfaces, at least one heat exchanging unit with two parallel extending longitudinal channels each with a male and a female connector for a heat exchanging medium and a cast coating layer on one of the main surfaces of the fibrous mat, the method comprising:

attaching at least two heat exchanger elements adjacent to each other, to a room delimiting surface, the uncoated main surfaces of the fibrous mats of the heat exchanger element are glued to said room delimiting surface, and the two male connectors of subsequently mounted heat exchanger elements are plugged into corresponding female connectors, of adjacent heat exchanger elements; and applying a cast mixture over the heat exchanger elements and the connectors so that a substantially flat cast surface is obtained, wherein a thickness of the cast coating is in a range of 2 to 8 mm and the at least one heat exchanging conduit is contained in the cast coating, and wherein the cast coating together with the at least one heat exchanging conduit, adheres to the fibrous mat.

* * * * *